US008615556B1

(12) United States Patent
Richards

(10) Patent No.: US 8,615,556 B1
(45) Date of Patent: Dec. 24, 2013

(54) TECHNIQUES FOR REDUCING BROADCAST MESSAGES

(75) Inventor: Thomas P. Richards, Hazelbrook (AU)

(73) Assignee: Symantec Corporation, Mountain View, CA (US)

( * ) Notice: Subject to any disclaimer, the term of this patent is extended or adjusted under 35 U.S.C. 154(b) by 956 days.

(21) Appl. No.: 12/346,183

(22) Filed: Dec. 30, 2008

(51) Int. Cl.
*G06F 15/16* (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| | | | | |
|---|---|---|---|---|
| 5,539,884 | A * | 7/1996 | Robrock, II | 709/227 |
| 5,632,018 | A * | 5/1997 | Otorii | 709/200 |
| 6,085,238 | A * | 7/2000 | Yuasa et al. | 709/223 |
| 6,820,174 | B2 * | 11/2004 | Vanderwiel | 711/141 |
| 6,888,792 | B2 * | 5/2005 | Gronke | 370/227 |
| 6,985,937 | B1 * | 1/2006 | Keshav et al. | 709/223 |
| 7,260,716 | B1 * | 8/2007 | Srivastava | 713/163 |
| 2004/0049573 | A1 * | 3/2004 | Olmstead et al. | 709/224 |
| 2005/0083857 | A1 * | 4/2005 | Takahashi et al. | 370/254 |
| 2006/0288076 | A1 * | 12/2006 | Cowings et al. | 709/206 |
| 2009/0157480 | A1 * | 6/2009 | Smith | 705/10 |

* cited by examiner

*Primary Examiner* — Brian P Whipple
(74) *Attorney, Agent, or Firm* — Wilmer Cutler Pickering Hale and Dorr LLP

(57) ABSTRACT

Techniques for reducing broadcast messages are disclosed. In one particular exemplary embodiment, the techniques may be realized as an apparatus for reducing broadcast messages. The apparatus may comprise a module to create a virtual group member list associated with at least one virtual group comprising at least members of a physical group. The apparatus may also comprise a module to send a broadcast message to members listed in the virtual group member list. The apparatus may further comprise a module to retain a responding member in the virtual group member list if a broadcast message is received from the responding member. The apparatus may still further comprise a module to remove a non-responding member from the virtual group member list if a broadcast message is not received from the non-responding member.

20 Claims, 5 Drawing Sheets

TECHNIQUES FOR REDUCING BROADCAST MESSAGES

FIELD OF THE DISCLOSURE

The present disclosure relates generally to process communications and, more particularly, to techniques for reducing broadcast messages.

BACKGROUND OF THE DISCLOSURE

Group communication is a paradigm for communication between processes that provides certain reliability and message ordering guarantees to participating message sender/receiver processes. Participating processes may be organized into named process groups. Each member of a named process group may receive broadcast messages sent by any other member of the group, and may also be able to send such broadcast messages. Guarantees applied to these messages may include ordering guarantees and delivery guarantees.

Ordering guarantees may include Causal Ordering and Total Ordering. Causal Ordering may guarantee that if a process receives, for example, message A and sends message B afterwards, then no other process will receive message B before message A. Total Ordering may guarantee that all processes see all broadcast messages in the exact same order. In order to achieve these ordering guarantees message, delivery may be guaranteed. In order to guarantee message delivery, all processes may have a consistent "view" of a group's current membership.

As might be expected all of these guarantees may introduce considerable overhead into a messaging system in the form of out-of-band messages used to coordinate group membership and signal message delivery or non-delivery. Reducing a number of named process groups in a system may significantly improve performance by avoiding costs associated with membership management. Reducing the number of named process groups may be achieved by multiplexing multiple "virtual channels" over a single "physical channel," where the term "channel" is used to indicate a process's connection to a named process group.

Multiplexing a virtual channel may be as simple as attaching a "virtual group name" to each message sent by a process. Receiving processes may use this extra information to determine which virtual group the message was sent to, and thusly a virtual channel on which the message should be received.

Not all members of a "physical group" may also be members of all multiplexed "virtual groups." For example, member A might be a member of a physical group X, but might not necessarily a member of a virtual group Y that multiplexes on group X. However, all physical group members may still receive multiplexed messages and may proactively discard them.

In view of the foregoing, it may be understood that there are significant problems and shortcomings associated with current virtual group broadcast technologies.

SUMMARY OF THE DISCLOSURE

Techniques for reducing broadcast messages are disclosed. In one particular exemplary embodiment, the techniques may be realized as an apparatus for reducing broadcast messages. The apparatus may comprise a module to create a virtual group member list associated with at least one virtual group comprising at least members of a physical group. The apparatus may also comprise a module to send a broadcast message to members listed in the virtual group member list. The apparatus may further comprise a module to retain a responding member in the virtual group member list if a broadcast message is received from the responding member. The apparatus may still further comprise a module to remove a non-responding member from the virtual group member list if a broadcast message is not received from the non-responding member.

In accordance with other aspects of this particular exemplary embodiment, the members of the at least one virtual group may transmit messages over a network associated with the physical group.

In accordance with further aspects of this particular exemplary embodiment, the apparatus may further comprise a module to wait a heartbeat time period before retaining the responding member in or removing the non-responding member from the virtual group member list.

In accordance with additional aspects of this particular exemplary embodiment, the heartbeat time period may be a variable time period.

In accordance with other aspects of this particular exemplary embodiment, the heartbeat time period may be a fixed time period.

In accordance with further aspects of this particular exemplary embodiment, the apparatus may further comprise a module to wait an additional reserve time before removing the non-responding member from the virtual group member list.

In accordance with additional aspects of this particular exemplary embodiment, the additional reserve time may be pre-determined.

In accordance with other aspects of this particular exemplary embodiment, the additional reserve time may be variable.

In accordance with further aspects of this particular exemplary embodiment, the apparatus may further comprise a module to filter outbound messages if the member list comprises one member.

In another particular exemplary embodiment, the techniques may be realized as a method for reducing broadcast messages. The method may comprise creating a virtual group member list associated with at least one virtual group comprising at least members of a physical group. The method may also comprise sending a broadcast message to members listed in the virtual group member list. The method may further comprise retaining a responding member in the virtual group member list if a broadcast message is received from the responding member. The method may still further comprise removing a non-responding member from the virtual group member list if a broadcast message is not received from the non-responding member.

In accordance with other aspects of this particular exemplary embodiment, the members of the at least one virtual group may transmit messages over a network associated with the physical group.

In accordance with further aspects of this particular exemplary embodiment, the method may further comprise waiting a heartbeat time period before retaining the responding member in or removing the non-responding member from the virtual group member list.

In accordance with additional aspects of this particular exemplary embodiment, the heartbeat time period may be a variable time period.

In accordance with other aspects of this particular exemplary embodiment, the heartbeat time period may be a fixed time period.

In accordance with further aspects of this particular exemplary embodiment, the method may further comprise waiting an additional reserve time before removing the non-responding member from the virtual group member list.

In accordance with additional aspects of this particular exemplary embodiment, the additional reserve time may be pre-determined.

In accordance with other aspects of this particular exemplary embodiment, the additional reserve time may be variable.

In accordance with further aspects of this particular exemplary embodiment, the method may further comprise filtering outbound messages if the member list comprises one member.

In accordance with additional aspects of this particular exemplary embodiment, at least one processor readable medium for storing a computer program of instructions configured to be readable by at least one processor for instructing the at least one processor to execute a computer process for performing the method may be provided.

In another particular exemplary embodiment, the techniques may be realized as an article of manufacture for reducing broadcast messages. The article of manufacture may comprise at least one processor readable medium, and instructions carried on the at least one medium, wherein the instructions are configured to be readable from the at least one medium by at least one processor and thereby cause the at least one processor to operate so as to create a virtual group member list associated with at least one virtual group comprising at least members of a physical group, send a broadcast message to members listed in the virtual group member list, retain a responding member in the virtual group member list if a broadcast message is received from the responding member, and remove a non-responding member from the virtual group member list if a broadcast message is not received from the non-responding member.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
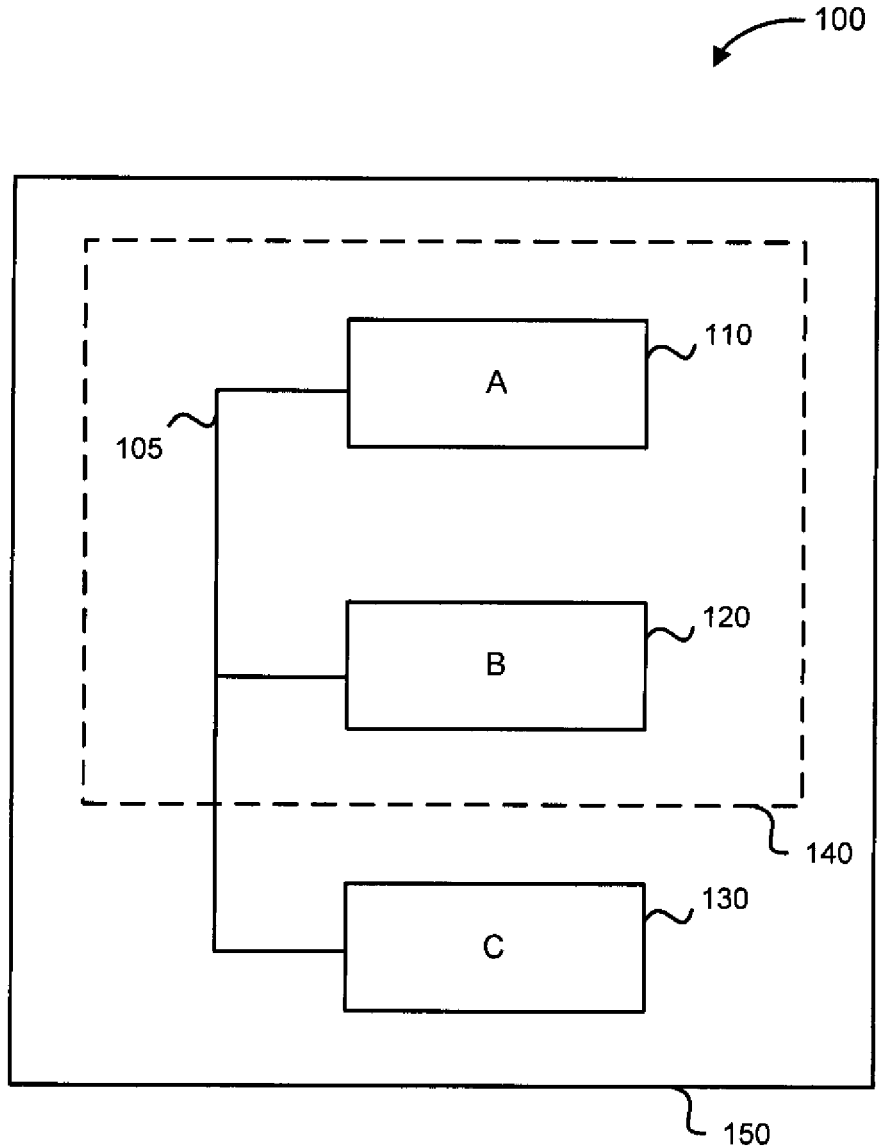
FIG. 1 shows a diagram view depicting computers in a physical group and a virtual group in accordance with an embodiment of the present disclosure.

Referring specifically to FIG. 1, there is shown a diagram 100 depicting computers in a physical group and a virtual group in accordance with an embodiment of the present disclosure. That is, diagram 100 of FIG. 1 depicts computer A 110, computer B 120, and computer C 130, which may be physical devices commonly known in the art. For example, any of computer A 110, computer B, 120, or computer C 130 may be a computer that is implemented as one or more servers. Also, any of computer A 110, computer B, 120, or computer C 130 may be a computer that may receive data from one or more inputs, produce data through one or more outputs, have one or more persistent storage devices for storing and retrieving data, and/or be in communication with one or more networks. Further, any of computer A 110, computer B, 120, or computer C 130 may be a computer that may operate using an operating system, and may load the operating system into memory in local persistent storage, for example, a hard drive, or may load the operating system into memory in shared storage across a network 105.

Each of the one or more networks referred to above may include, but is not limited to, for example, a wide area network (WAN), a local area network (LAN), a fiber channel network, an optical network, a SCSI network, a global network such as the Internet, a telephone network such as a public switch telephone network, a wireless communication network, a cellular network, an intranet, or the like, or any combination thereof. Also, each of the one or more networks may be used so that components of the present disclosure may be in communication with one another. In exemplary embodiments of the present disclosure, the network 105 may include one or any number of the exemplary types of networks mentioned above operating as a stand-alone network or in cooperation with other networks. Use of the term network herein is not intended to limit the network 105 to a single network. The network 105 may carry signals from one computer to another computer. The signals may be in the form of channels, and there may be one or more channels on the same network 105. The channels may be multiplexed so that the network 105 may be able to transmit more than one channel simultaneously.

The diagram 100 of FIG. 1 also depicts a physical group 150, which may be a collection of one or more computers that share the common network 105. The physical group 150 may be a collection of computers that provides full membership management and messaging reliability and/or ordering guarantees.

The diagram 100 of FIG. 1 further depicts a virtual group 140, which may be a collection of one or more computers that are in communication. In one embodiment, the virtual group 140 may comprise all or some (as shown) of the computers in the physical group 150. In another embodiment, the virtual group 140 may comprise other computers, in addition to one or more of the computers in the physical group 150. In another embodiment, the virtual group 140 may comprise zero computers. In addition to virtual group 140, other virtual groups may exist as a layer on top of the physical group 150.

FIG. 1 provides one example of physical group 150 and virtual group 140. Computer A 110, computer B 120, and computer C 130 are all connected via network 105. Computer A 110, computer B 120, and computer C 130 are members of physical group 150. Computer A 110 and Computer B 120 are also members of virtual group 140. As an alternate example, computer A 110 and computer C 130 may also be members of another virtual group, computer C 130 may be a member of yet another virtual group, and yet another virtual group may exist on top of physical group 150 to which no computers are members.

A system to create physical group 150 (or one or more additional physical groups) or virtual group 140 (or one or more additional virtual groups), to link computers with physical group 150 and/or virtual group 140, to create a member list, to send and receive heartbeat messages, and to update the member list based on the received heartbeat messages may be separate from computer A 110, computer B 120, computer C 130, and/or the network 105, and may reside in a separate physical server or servers in the form of one or more modules operating electronically on the separate physical server or servers. In an alternate embodiment, such a system may reside as a collection of one or more modules on either computer A 110, computer B 120, computer C 130, and/or another server or computer in communication with the network 105.

Figure 2:
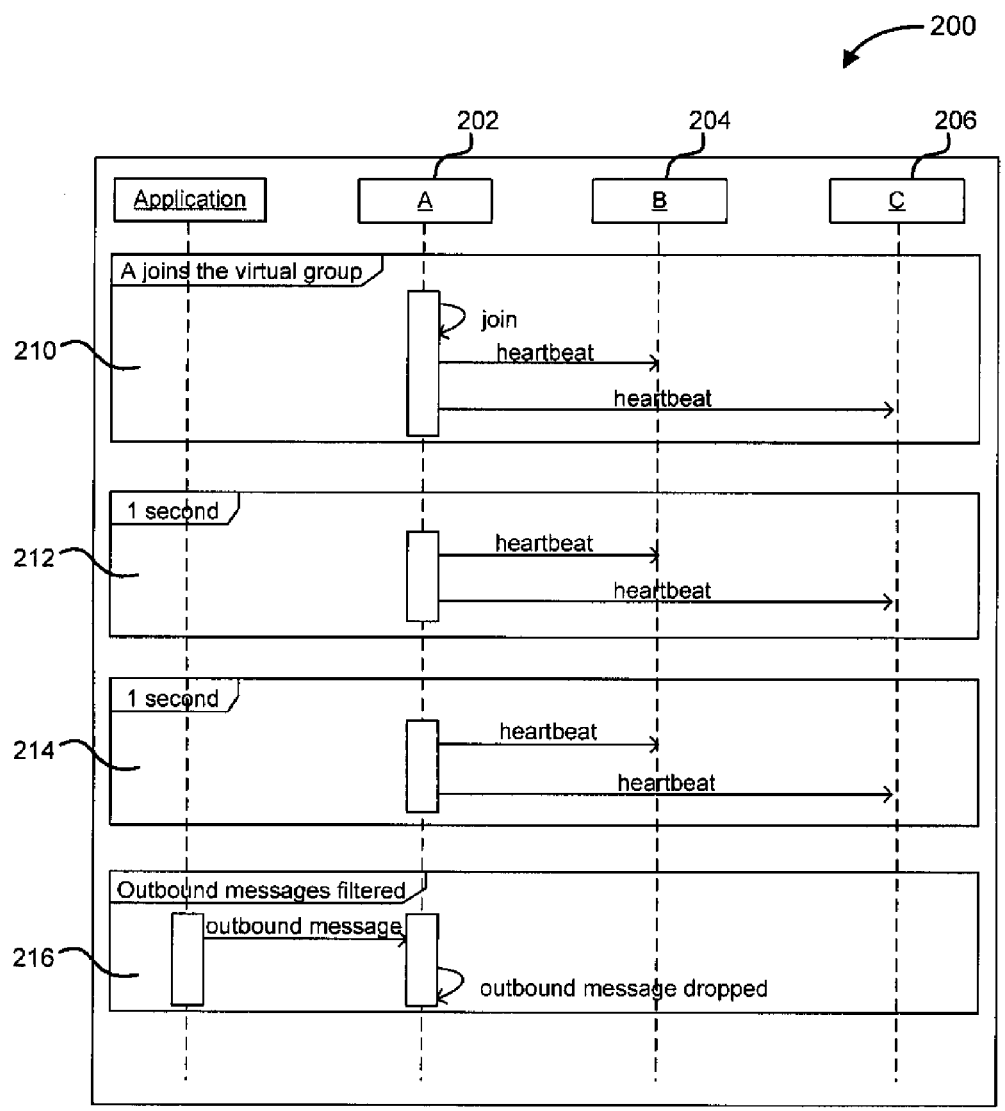
FIG. 2 shows an example signal graph of a member joining a virtual group where no other members are active in accordance with an embodiment of the present disclosure.

Referring specifically to FIG. 2, there is shown an example signal graph 200 of a member joining a virtual group where no other members are active in accordance with an embodiment of the present disclosure. An exemplary physical group called "pgroup" may contain three members: member A 202, member B 204, and member C 206. An exemplary virtual group called "vgroup" may initially contain no members. Virtual group vgroup may be multiplexed over physical group pgroup, along with one or more other virtual groups.

In the example depicted in FIG. 2, a heartbeat time period and a reserve time period (not shown) may be specified. The heartbeat time period is a time period when each member of a virtual group is set to transmit a heartbeat to the virtual group if it is connected to the virtual group. The time period may be fixed or variable. A common heartbeat time period may be shared by each member of a virtual group. Different virtual groups may have different heartbeat time periods.

The reserve time period may be an additional time that a member of a virtual group may wait to receive a heartbeat from one or more other members of the virtual group. The reserve time period may be zero, or may be a discrete time interval. The reserve time period may be shared by each member of a virtual group, or the reserve time period may be different for one or more members of a virtual group.

In the example shown in FIG. 2, the heartbeat time period may be set to one second, and the reserve time period may be set to one second. The heartbeat time period and the reserve time period need not be set to the same time period.

At a first time interval 210, member A 202 may join the virtual group vgroup, and may send a heartbeat message to the other members of the physical group pgroup. The heartbeat message may be a broadcast message that may communicate, for example, a sending member's name, a recipient virtual group, a timestamp, and/or a data payload. The heartbeat message may be a "broadcast" type message to computers in a given network or virtual group. In another embodiment, the heartbeat message may be a "unicast" message to individual computers in a network or a virtual group. The data payload may be any kind of additional message that is beneficial to send via a virtual group. Member A 202 may initially populate a member list for virtual group vgroup with all of the members of the physical group pgroup. In this example, Member A 202 may populate the member list for virtual group vgroup with member A 202, member B 204, and member C 206.

At a second time interval 212 (e.g., one second from when member A 202 joined the virtual group vgroup), member A 202 may send another heartbeat message to the other members of the virtual group vgroup. Member A 202 may not receive any heartbeat messages during this time interval 212.

At a third time interval 214 (e.g., two seconds from when member A 202 joined the virtual group vgroup), member A 202 may send another heartbeat message to the other members of the virtual group.

At a fourth time interval 216 (e.g., after the time period of two seconds, one second for the heartbeat time period and one second for the reserve time period), member A still has not received any heartbeat messages from any other member of the virtual group vgroup. Member A 202 may then assume that there are no other members in the virtual group vgroup, and filters all outbound messages to virtual group vgroup to be dropped. If member A 202 does not receive any heartbeat messages from any other member of the virtual group vgroup, member A 202 may continue to filter and drop all of the outbound messages to virtual group vgroup.

Figure 3:
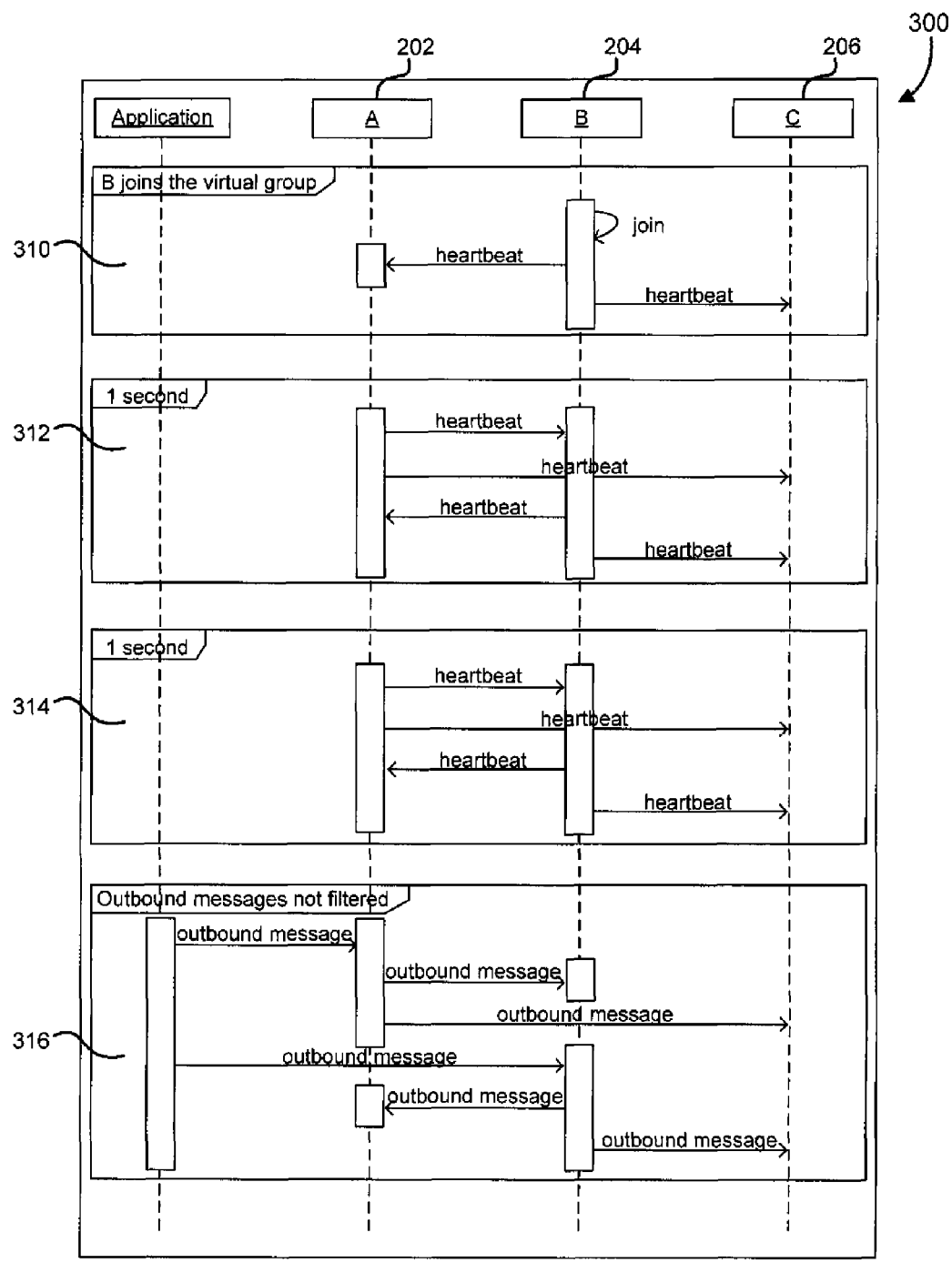
FIG. 3 shows an example signal graph where two members are active in accordance with an embodiment of the present disclosure.

Referring specifically to FIG. 3, there is shown an example signal graph 300 where two members are active in a virtual group accordance with an embodiment of the present disclosure. In FIG. 3, member A 202 is initially not active in the virtual group vgroup. In contrast, in FIG. 2, member A 202 has been active in virtual group vgroup, and has not received any heartbeat messages in the heartbeat time period and the reserve time period. Member A's 202 member list therefore only may contain member A 202.

At a first time interval 310, member B 204 joins the virtual group vgroup. When member B 204 joins the virtual group vgroup, member B 204 may assume that the virtual group vgroup contains all of the members in the physical group pgroup, and so may populate its member list to be all of the members in the physical group pgroup. Member B 204 may send a heartbeat message to the other members of the physical group pgroup. Member A 202 may receive the heartbeat message from member B 204, and may create a member list of member A 202 and member B 204, not shown in FIG. 3.

At a second time interval 312 (e.g., one second after member B 204 joins the virtual group vgroup), member A 202 and member B 204 may both transmit heartbeat messages to the virtual group vgroup. Member A 202 may receive member B's 204 heartbeat message and member B 204 may receive member A's 202 heartbeat message. Member A's 202 member list may include member A 202 and member B 204, and member B's 204 member list may include member A 202, member B 204, and member C 206.

At a third time interval 314 (e.g., two seconds after member B 204 joined the virtual group vgroup), member A 202 and member B 204 may both transmit a heartbeat message to the other members of the physical group pgroup. Member A 202 may receive member B's 204 heartbeat message, and member B 204 may receive member A's 202 heartbeat message.

At a fourth time interval 316 (e.g., after the time period of two seconds, one second for the heartbeat time period and one second for the reserve time period), member B 204 may drop member C 206 from member B's 204 member list. Both member A 202 and member B 204 may now have a member list of member A 202 and member B 204. Since member A's 202 member list and member B's 204 member list both have more than one member, member A 202 and member B 204 do not filter outbound messages to virtual group vgroup.

Figure 4:
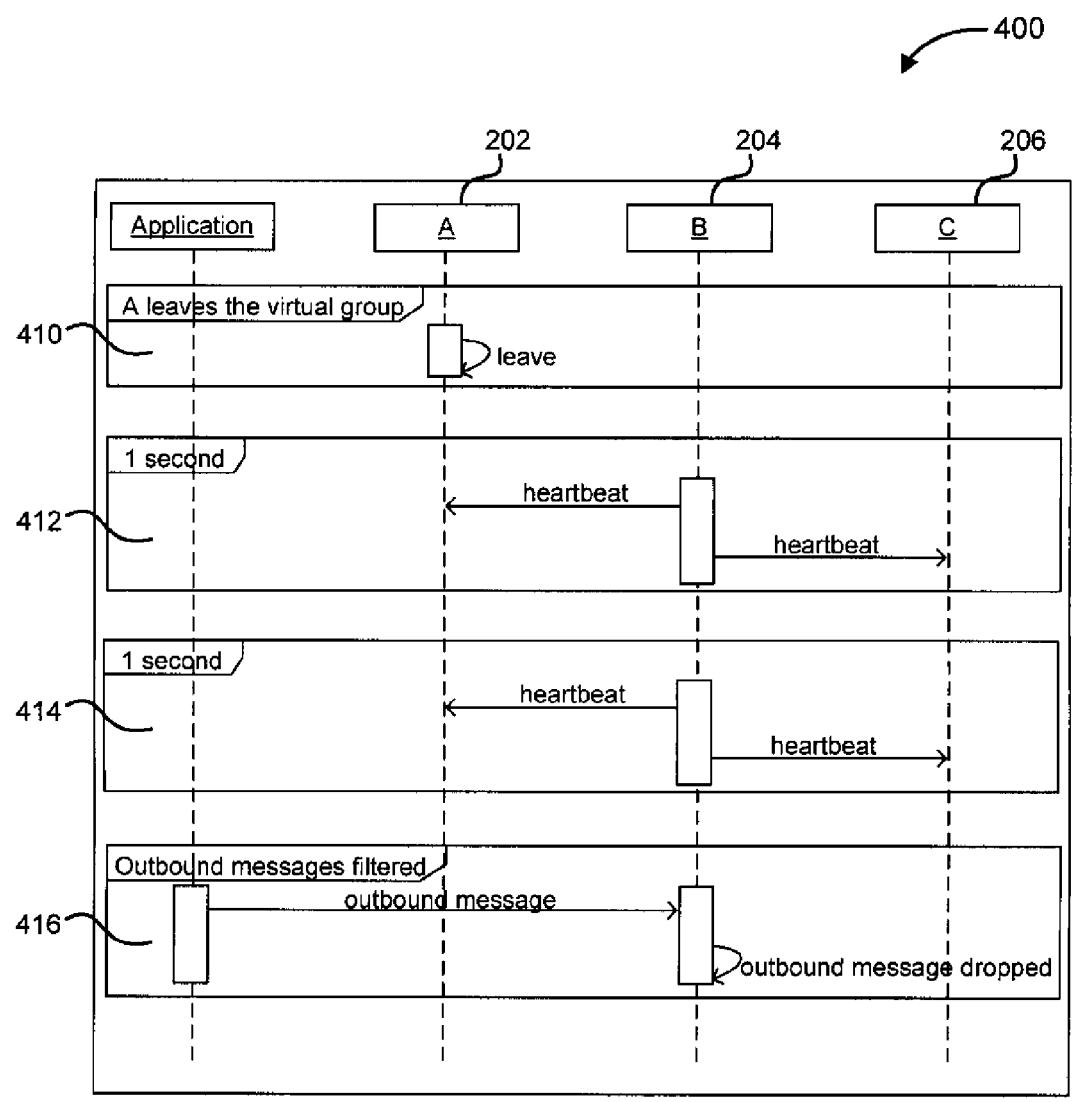
FIG. 4 shows an example signal graph where one member leaves a virtual group in accordance with an embodiment of the present disclosure.

Referring specifically to FIG. 4, there is shown an example signal graph 400 where one member leaves a virtual group in accordance with an embodiment of the present disclosure. In FIG. 4, member C 206 may not be communicating with other members of virtual group vgroup. Member A 202 and member B 204 may both communicate with other members of the virtual group vgroup before an initial time. Both member A 202 and member B 204 may have a member list of member A 202 and member B 204.

At a first time interval 410 (e.g., an initial time), member A 202 may leave the virtual group vgroup.

At a second time interval 412 (e.g., one second after member A 202 left the virtual group), member B 204 may transmit a heartbeat message to the other members of the virtual group vgroup. Member B 204 may not receive any heartbeat messages from any other members of the virtual group vgroup at this time period.

At a third time interval 414 (e.g., two seconds after member A 202 left the virtual group), member B 204 may transmit a heartbeat message to the other members of the virtual group vgroup. Member B 204 may not receive any heartbeat messages from any other members of the virtual group vgroup at this time period.

At a fourth time interval 416 (e.g., after one second for the heartbeat time period and one second for the reserve time period), member B 204 may remove member A 202 from its member list, leaving only member B 204 in the member list of member B 204. Member B 204 may filter outbound messages to virtual group vgroup and may block further messages on the virtual group.

Figure 5:
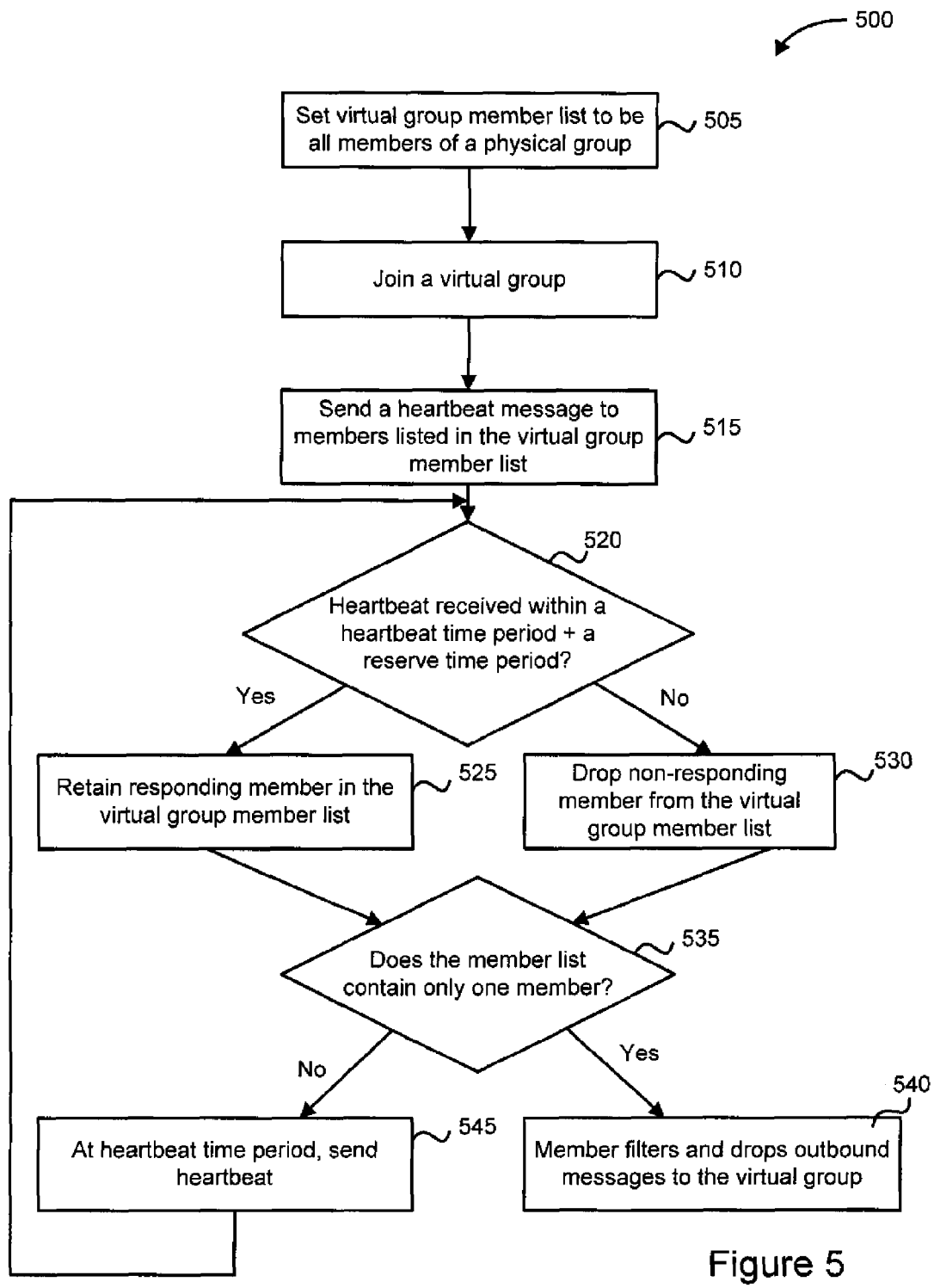
FIG. 5 shows a flowchart depicting a method of reducing broadcast messages in accordance with an embodiment of the present disclosure.

Referring specifically to FIG. 5, there is shown a flowchart depicting a method 500 of reducing broadcast messages in accordance with an embodiment of the present disclosure. The method 500 describes how a member may enter into a virtual group.

In step 505, the member may set a member list or member population group to include some or all members of a physical group to which the member is a part.

In step 510, the member may join a virtual group. Joining the virtual group may entail sending a message to the virtual group or electronically noting within the member that the member has joined the virtual group.

In step 515, the member may send a heartbeat message to members listed in the member list or member population group, indicating that the member is active in the virtual group. The heartbeat message may be in the form of a "broadcast" message to all of the members of the member list. In another embodiment, the heartbeat message may be in the form of a "unicast" message to all or some of the members of the member list individually.

In step 520, the member may wait for a proscribed time period for heartbeat messages from other members of the virtual group. The proscribed time period may be a sum of a heartbeat time period and a reserve time period. The heartbeat time period and the reserve time period may be set by the member, or may be set by the virtual group, or may be dynamic according to the needs of the member, the other members, and/or the virtual group.

In step 525, if a heartbeat message is not received from a member listed in the member list, that member may be dropped from the member list.

In step 530, if a heartbeat message is received from any member, whether or not they are listed in the member list, that member may be added to the member list.

In step 535, the member may check the member list to determine the number of members in the member list.

In step 540, if the number of members on the member list equals one, meaning that no other heartbeat messages have been received within the heartbeat time period and the reserve time period, then the member may filter and drop outbound messages to the virtual group. If the member later receives a heartbeat message from a member who has joined the virtual group, then the member may resume sending messages to the virtual group at that time. If the number of members in the physical group equals one, so that the member is the only member of the physical group, then the member may filter and drop outbound messages to the virtual group. In another embodiment, if the number of members in the physical group equal one, the member may filter and drop outbound messages to the virtual group without waiting the heartbeat time period and/or the reserve time period.

In step 545, if the number of members on the member list is greater than one, then at the next heartbeat time period, the member, along with all other members, may transmit a heartbeat message to the other members on the member's member list. The method 500 may repeat for as long as necessary to ensure a timely update of the member list of a virtual group.

At this point it should be noted that reducing broadcast messages in accordance with the present disclosure as described above typically involves the processing of input data and the generation of output data to some extent. This input data processing and output data generation may be implemented in hardware or software. For example, specific electronic components may be employed in a processor or server or collection of computers or similar or related circuitry for implementing the functions associated with reducing broadcast messages in accordance with the present disclosure as described above. Alternatively, one or more processors operating in accordance with instructions may implement the functions associated with reducing broadcast messages in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for reducing broadcast messages comprising:
one or more processors communicatively coupled to a network, wherein the one or more processors are configured to:
create a first virtual group member list associated with a first virtual group comprising at least one member of a first physical group,
create a second virtual group member list comprising at least one member of a second physical group,
wherein the first and second physical groups are associated with respective first and second physical channels, and wherein the first and second virtual groups are associated with respective first and second virtual channels that are configured to be multiplexed over the first and second physical channels;

send a broadcast message to members listed in the first and second virtual group member lists;

retain a responding member in the first and second virtual group member lists if a broadcast message is received from the responding member; and remove a non-responding member from the first and second virtual group member lists if a broadcast message is not received from the non-responding member.

2. The system of claim 1, where the members of the first and second virtual groups transmit messages over a network associated with the first and second physical groups.

3. The system of claim 1, further comprising: a module to wait a heartbeat time period before retaining the responding member in or removing the non-responding member from the first and second virtual group member lists.

4. The system of claim 3, where the heartbeat time period is a variable time period.

5. The system of claim 3, where the heartbeat time period is a fixed time period.

6. The system of claim 3, further comprising: a module to wait an additional reserve time before removing the non-responding member from the first and second virtual group member lists.

7. The system of claim 6, where the additional reserve time is pre-determined.

8. The system of claim 6, where the additional reserve time is variable.

9. The system of claim 1, further comprising a module to filter outbound messages if at least one of the member lists comprises one member.

10. A method for reducing broadcast messages comprising:

creating a first virtual group member list associated with a first virtual group comprising at least one member of a first physical group;

creating a second virtual group member list associated with a second virtual group comprising at least one member of a second physical group;

wherein the first and second physical groups are associated with respective first and second physical channels, and wherein the first and second virtual groups are associated with respective first and second virtual channels that are multiplexed over the first and second physical channels;

sending a broadcast message to at least one member listed in the first and second virtual group member lists;

retaining a responding member in the first and second virtual group member lists if a broadcast message is received from the responding member; and removing a non-responding member from the first and second virtual group member lists if a broadcast message is not received from the non-responding member.

11. The method of claim 10, where the at least one member of the first and second virtual groups transmits a messages over a network associated with the first and second physical groups, respectively.

12. The method of claim 10, further comprising: waiting a heartbeat time period before retaining the responding member in or removing the non-responding member from the first and second virtual group member lists.

13. The method of claim 12, where the heartbeat time period is a variable time period.

14. The method of claim 12, where the heartbeat time period is a fixed time period.

15. The method of claim 12, further comprising: waiting an additional reserve time before removing the non-responding member from the first and second virtual group member lists.

16. The method of claim 15, where the additional reserve time is pre-determined.

17. The method of claim 15, where the additional reserve time is variable.

18. The method of claim 10, further comprising filtering outbound messages if at least one of the member lists comprises one member.

19. At least one non-transitory processor readable storage medium for storing a computer program of instructions configured to be readable by at least one processor for instructing the at least one processor to execute a computer process for performing the method as recited in claim 10.

20. An article of manufacture for reducing broadcast messages, the article of manufacture comprising:

at least one non-transitory processor readable storage medium; and instructions carried on the at least one storage medium;

wherein the instructions are configured to be readable from the at least one storage medium by at least one processor and thereby cause the at least one processor to operate so as to:

create a first virtual group member list associated with a first virtual group comprising at least one member of a first physical group;

create a second virtual group member list associated with a second virtual group comprising at least one member of a second physical group;

wherein the first and second physical groups are associated with respective first and second physical channels, and wherein the first and second virtual groups are associated with respective first and second virtual channels that are multiplexed over the first and second physical channels, simultaneously;

send a broadcast message to at least one member listed in the first and second virtual group member lists;

retain a responding member in the first and second virtual group member lists if a broadcast message is received from the responding member; and remove a non-responding member from the first and second virtual group member lists if a broadcast message is not received from the non-responding member.

* * * * *